United States Patent
Emericks et al.

(10) Patent No.: US 6,973,181 B2
(45) Date of Patent: Dec. 6, 2005

(54) METHOD OF GENERATING A RING SIGNAL IN A SUBSCRIBER LINE INTERFACE CIRCUIT TECHNICAL FIELD

(75) Inventors: Anders Emericks, Solna (SE); Henrik Hellberg, Solna (SE)

(73) Assignee: Infineon Technologies Wireless Solutions Sweden AB, Kista (SE)

( * ) Notice: Subject to any disclaimer, the term of this patent is extended or adjusted under 35 U.S.C. 154(b) by 297 days.

(21) Appl. No.: 10/323,542

(22) Filed: Dec. 18, 2002

(65) Prior Publication Data
US 2003/0133564 A1 Jul. 17, 2003

Related U.S. Application Data

(63) Continuation of application No. PCT/SE01/01446, filed on Jun. 21, 2001.

(30) Foreign Application Priority Data
Jun. 21, 2001 (SE) .................................... 0002350

(51) Int. Cl.[7] .............................................. H04M 1/00
(52) U.S. Cl. ..................... 379/399.01; 379/413.01; 379/388.06; 379/390.01
(58) Field of Search ................... 379/387.01, 388.06, 379/395, 399.01, 387.02, 399.02

(56) References Cited

U.S. PATENT DOCUMENTS

| | | | |
|---|---|---|---|
| 5,511,118 A | 4/1996 | Gores et al. ................ 379/399 |
| 5,649,009 A | 7/1997 | Enriquez et al. ............ 379/399 |
| 5,691,658 A | 11/1997 | Klein .......................... 327/104 |
| 5,734,712 A * | 3/1998 | Randahl ...................... 379/382 |
| 6,119,090 A * | 9/2000 | Emericks et al. ......... 379/399.01 |
| 6,570,984 B1 * | 5/2003 | Shalev ........................ 379/382 |
| 6,661,894 B1 * | 12/2003 | Heise ...................... 379/399.01 |
| 6,678,377 B1 * | 1/2004 | Pasetti et al. ................ 379/413 |
| 6,735,302 B1 * | 5/2004 | Caine et al. ................. 379/405 |

FOREIGN PATENT DOCUMENTS

| | | | |
|---|---|---|---|
| EP | 0 571 109 A2 | 11/1993 | ........... H04M 3/18 |
| EP | 0 957 626 A2 | 11/1999 | .......... H04M 19/00 |
| EP | 0 984 657 A2 | 3/2000 | .......... H04Q 11/04 |
| GB | 2290921 A | 1/1996 | .......... H04M 19/02 |
| WO | WO99/27703 | 6/1999 | .......... H04M 19/00 |

* cited by examiner

Primary Examiner—Curtis Kuntz
Assistant Examiner—Tuan Pham
(74) Attorney, Agent, or Firm—Baker Botts L.L.P.

(57) ABSTRACT

In a method and a device for controlling the magnitude of the generated ring signal in a the Subscriber Line Interface Circuit (SLIC) the voltage of the A and B lines to the subscriber from the SLIC is compared to a reference voltage. The device is arranged to control the magnitude of the generated ring signal voltage in response to the outcome of the comparison. In particular, the device is arranged to control the ring signal voltage so that the ring signal voltage is reduced if the voltage on the A or B line exceeds the reference voltage. Also, the reference voltage is preferably chosen so that there is no risk for saturation of the final stages. The reference voltage is preferably selected to have a value being related to the value of the negative supply voltage.

19 Claims, 2 Drawing Sheets

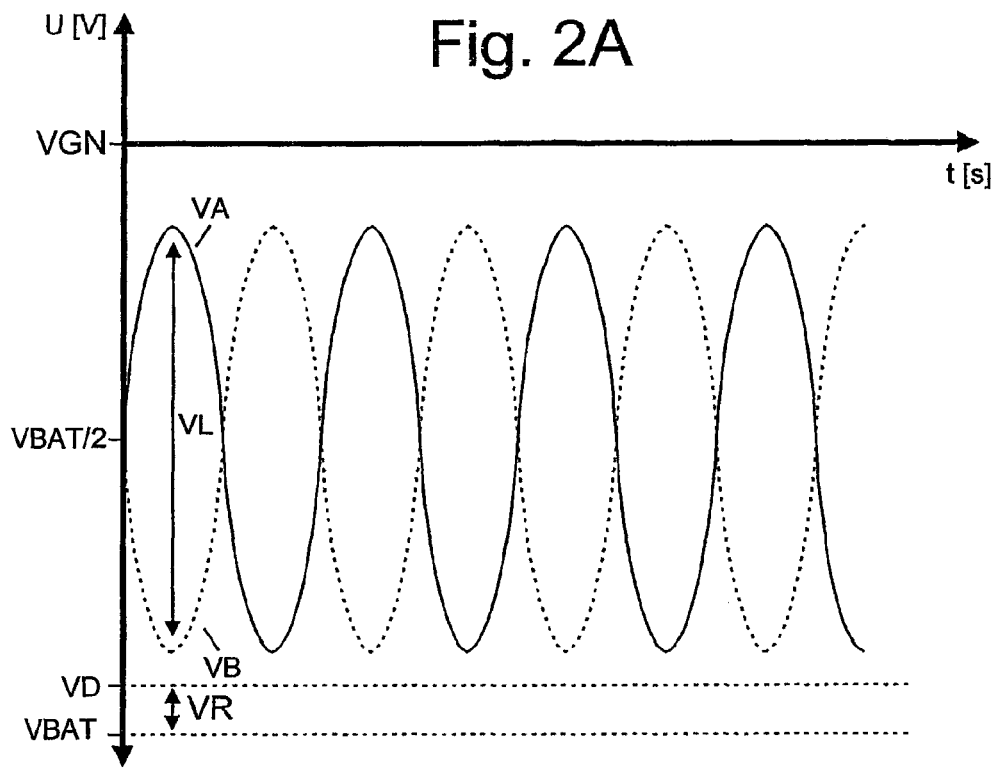
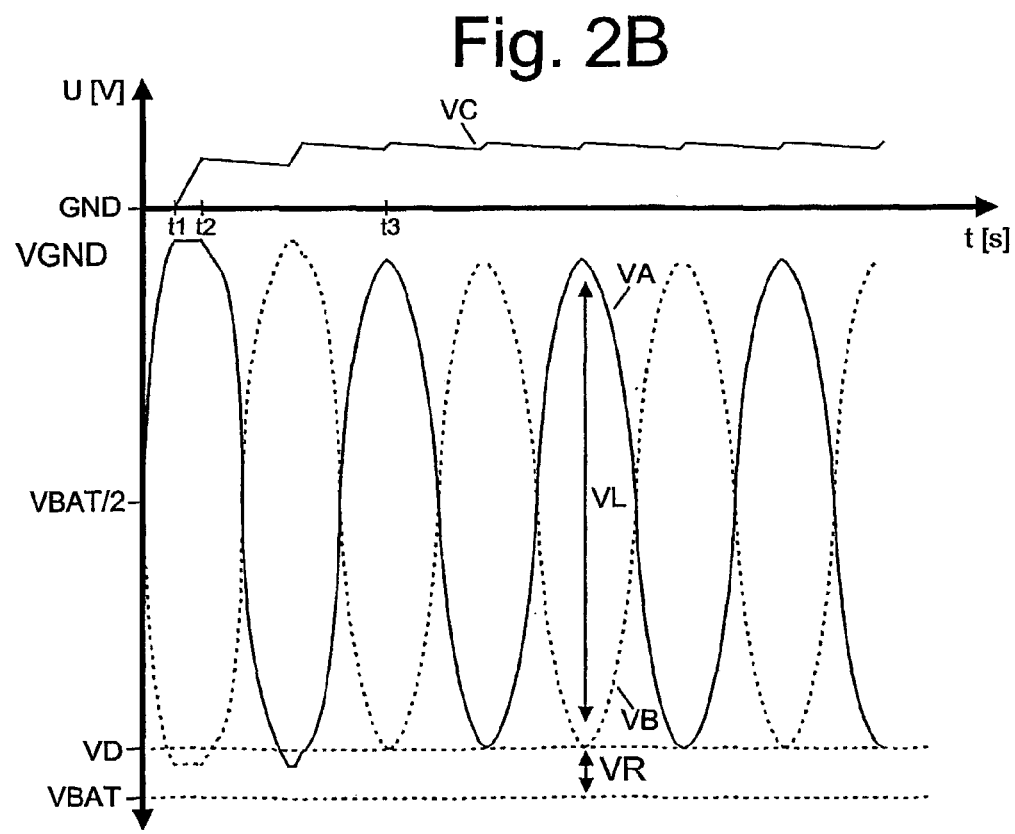

METHOD OF GENERATING A RING SIGNAL IN A SUBSCRIBER LINE INTERFACE CIRCUIT TECHNICAL FIELD

CROSS REFERENCE TO RELATED APPLICATION

This application is a continuation of copending International Application No. PCT/SE01/01446 filed Jun. 21, 2001, which designates the United States.

BACKGROUND OF THE INVENTION

The present invention relates to a method of generating a ring signal in a subscriber line interface circuit (SLIC).

In a subscriber line interface circuit (SLIC) many tasks are performed. One of the tasks performed is the generation of a ring signal.

In order to meet the requirements put on the ring signal, a SLIC provided with an integrated ring signal generation function must be capable of generating a ring signal by applying some particular voltage. Furthermore, the load over which the ring signal voltage is applied can vary. Thus, the value of the resistance of the load, measured in REN (Ring Equivalent Number), usually varies between 1 REN that corresponds to about 7 kohm, and 5 REN that is about 1.4 kohm. However, the variations can be larger, and the SLIC should generate a lowest minimum ring voltage regardless of the actual load.

Furthermore, in order to reduce the area of the chip, it is desired to use the final stage of the SLIC for generating the ring signal. The final stage is normally used for feeding the telephone of the subscriber with current and a speech signal.

Also, the currents and the voltages required for generating the ring signal are normally within the operation range of the final stage.

A signal having the correct frequency, i.e. 12–60 Hz, is fed to a ring signal input point of the SLIC. The signal is amplified internally and is via the final stages of the SLIC fed to the twin cable connection connecting the subscriber to the SLIC.

When the final stages are fed with current from a negative voltage terminal and a ground terminal it is required that the amplifier is controlled in order to ensure that the final stages are not saturated. Such a saturation would inevitably result in a distortion of the ring signal.

In order to control the amplifying process, the output ring signal is fed back to the input terminal in order to obtain a desired ring signal amplification between the ring signal input point to the twin cable connection. This amplification is not to be confused with the internal amplification of the SLIC.

The use of the SLIC as a ring signal generator is associated with certain limitations. Thus, since an SLIC has a limited internal amplification, the output impedance will have significant magnitude. This output impedance will result in voltage division between the output impedance and the ring signal load. If the ring signal load has a high impedance an adequate ring signal voltage will be applied over the ring signal load.

However, if the ring signal load has a low value, the ring signal voltage will be reduced due to the output impedance of the SLIC.

Thus, the ring signal voltage will vary in response to the ring signal load. Furthermore, the system will be sensitive to variations in the input signal and the negative voltage of the input terminal. If the input signal has a low voltage, the result will be a low ring signal voltage. On the other hand, if the input voltage is too high, the final stages will be saturated and a distorted ring signal will be generated. Also, if the negative voltage of the input terminal would be reduced, a distorted ring signal would be generated.

In order to solve the problem resulting from the variations of ring signal loads, the ring signal voltage can be set to a higher value giving a correct ring signal for a ring signal load of 5 REN. The result will be that a correct ring signal will be generated for loads having an impedance corresponding to 5 REN.

However, in order to avoid saturation of the final stages for impedances having an REN value lower than 5 REN, the negative voltage at the supply terminal must be increased.

Variations in the input signal can be solved in the same way.

Thus, in order to avoid saturation of the final stages, the negative voltage of the supply terminal is increased in accordance with the expected input signal variations.

Further, variations in the negative voltage of the supply terminal can be compensated for by a negative voltage having a magnitude, that is sufficient for compensating for any such variations.

In conclusion, it is necessary to increase the negative voltage at the input terminal in order to compensate for all the different variations. Since the generation of a ring signal requires a high voltage even without an increased voltage, such an increase is not desired. Also, the power generated in the circuit will increase. As a result hereof the circuitry will require components capable of operating correctly at higher voltages, which will possibly increase the chip area required.

Thus, there exists a need for a more robust method for generating a ring signal that is capable of compensating for variations in the ring signal load, the input signal and the negative supply voltage, without having to increase the negative supply voltage, and thereby reduce the required supply voltage and hence save power both in the circuit and on the SLIC.

SUMMARY OF THE INVENTION

It is an object of the present invention to overcome the problems outlined above and to provide a method of generating a ring signal, which is capable of compensating for variations in the ring signal load, the input signal and the negative supply voltage, without having to increase the negative supply voltage, and thereby reduce the required supply voltage and hence save electric power used both in the circuit and on the SLIC.

This object and others are obtained by a method and a device according to which the voltage of the A and B lines to the subscriber from a subscriber line interface circuit (SLIC) is compared to a reference voltage. The device is arranged to control the magnitude of the generated ring signal voltage in response to the outcome of the comparison. In particular, the device is arranged to control the ring signal voltage so that the ring signal voltage is reduced if the voltage on the A or B line is below or exceeds the reference voltage. Also, the reference voltage is preferably chosen so that there is no risk for saturation of the final stages of the SLIC. The reference voltage is preferably selected to have a value related to the value of a negative supply voltage.

Thus, when a period ring signal is generated, amplified and output on the twin cable connection, i.e. on the A and B lines from the SLIC to the subscriber, the device senses the potentials on the A and B lines. If the potentials on either of these lines is below a particular voltage, the voltage of the output ring signal will be controlled to have a reduced magnitude.

In a preferred embodiment variations in the input signal are compensated for by the input signal value to a value higher than the expected optimal value. The device will then control the ring signal voltage to a correct magnitude.

Further, since the reference voltage is related to the negative supply voltage, any variation in the supply input voltage will result in a corresponding change in the reference voltage. Thus, there is a protection against saturation in the final stages of the SLIC if the negative supply voltage should be reduced. If, on the other hand the negative supply voltage should increase, the ring signal voltage can be increased.

The device for providing a ring signal generally comprises a ring signal source generating some input ring signal voltage having a small amplitude, such as the amplitude of control voltages normally used in electronic circuits, typically in the range of a few Volts, e.g. 2–5 Volts, that is to transformed such as amplified in a suitable manner to an output ring signal voltage normally having a significantly higher amplitude, such as in the range of a few tenths of Volts, e.g. about 50 Volts. The device further comprised a converter such as a suitable amplifier connected to the ring signal source and having two output terminals. The converter converts the periodic input ring signal voltage to two electrical currents of the same low intensity.

These two electrical currents are further amplified in two current amplifiers connected to the converter. After the amplifying also two identical electrical currents are obtained but having a significantly higher intensity. One of the identical electrical currents or one of the amplified identical electrical currents is inverted in an inverter, the inverter only changing the direction of the current but not the amplitude or magnitude thereof. Suitable means such as simple lines from the output terminals of the current amplifiers are connected to conduct the amplified and inverted identical electrical currents to the first and second output terminals to form the ring signal voltage applied to the ring signal load.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIGS. 2a and 2b are voltage diagrams illustrating the output voltages, i.e. the potentials at the output clamps, of the SLIC shown in FIG. 1 during operation thereof as a function of time.

DETAILED DESCRIPTION OF THE PREFERRED EMBODIMENTS

Figure 1:
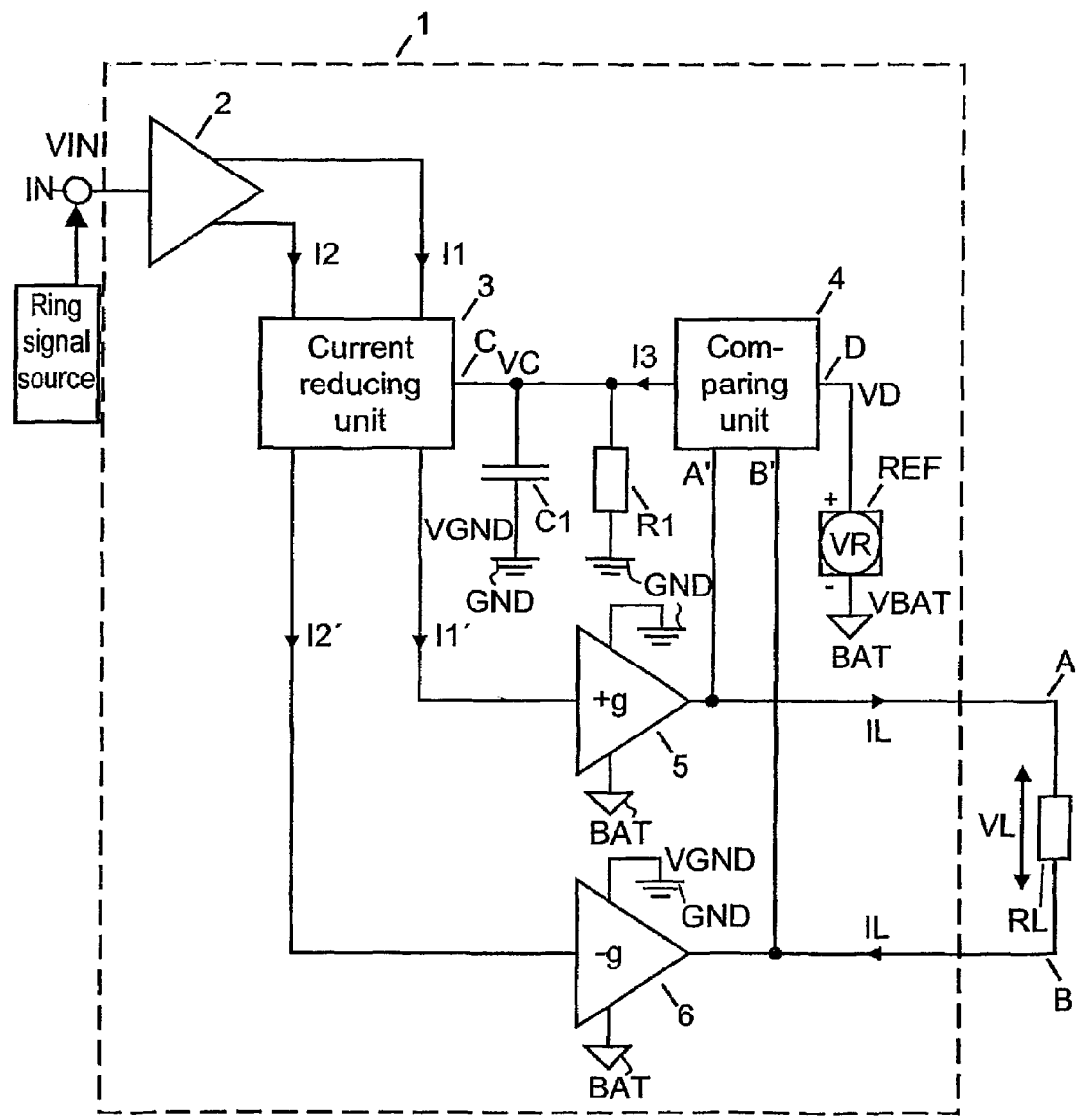
FIG. 1 is a block diagram of a subscriber line interface circuit (SLIC) connected to a load.

In FIG. 1, a block diagram of a subscriber line interface circuit (SLIC) 1 connected to a ring signal load RL is shown. The circuit 1 has two output clamps or general output terminals A and B. The load RL is connected between the output terminals A and B.

A general input terminal IN is connected to an amplifier 2 that converts the voltage VIN applied to the input terminal IN into two currents I1 and I2, these two currents having the same magnitude and direction as each other, e.g. both flowing out of the amplifier. The input signal VIN is a voltage constituting the primary or basic ring signal having the required periodic behaviour, such as a sine signal. The input signal is mapped into the real output ring signal voltage VL applied over the ring signal load RL as will be described hereinafter, the output signal having the same basic shape as the input ring signal. The two electrical currents I1 and I2 also have the same basic shape as the input ring signal VIN.

The currents I1 and I2 are fed to a current reducing unit 3, which in turn, from the currents I1 and I2 respectively, generates currents I1' and I2'. Further, the current reducing unit 3 has a control input terminal C. The control input terminal C has a high electric impedance and the unit 3 senses the voltage VC appearing at this input control terminal C.

The voltage VC sensed on the input terminal C is used to determine the amount or fraction of the input currents I1 and I2, which is allowed to pass through the unit 3 to form the output currents I1' and I2', these currents I1' and I2' thus being identical to each other and copies of the input currents I1 and I2 but possibly having a lower amplitude.

In a preferred embodiment, I1' is set to be equal to I1 and I2' is set to be equal to I2 if the voltage VC sensed at the control terminal C is equal to zero. If, on the other hand, the voltage VC at the control terminal C is larger than zero, the currents I1' and I2' are reduced, i.e. their amplitudes are reduced, until, for some value of VC, the output currents I1' and I2' are set to be equal to zero. Also, in a preferred embodiment a resistor R1 and a capacitor CL are connected between the terminal C and a ground potential VEND at a ground terminal GNU.

The possibly reduced currents I1' and I2' are fed to current amplifiers 5 and 6, respectively, having fixed values of amplification, on lines interconnecting the current reducing unit 3 and the current amplifiers 5 and 6. The current amplifiers are supplied with power by being connected to a ground terminal GND and a supply voltage VBAT at a supply voltage terminal BAT. Thus, the first output current I1' is fed to the first current amplifier 5 and the second current I2', that is identical to I1', is fed to the second current amplifier 6. The current amplifiers 5 and 6 amplify the currents I1' and I2' by fixed amplification factors of +g and −g, respectively, i.e. they have the same VA; e of amplification but one of them provides an output current having a direction opposite to that of the amplified current output from the other current amplifier. The currents IL output from the current amplifiers 5 and 6 will then have the same value but opposite directions and are fed to the load RL.

The output terminals of the current amplifiers 5, 6, which are also or are connected to the output terminals A and B of the SLIC 1, are further connected to input terminals A' and B' of a comparing unit 4, the comparing unit 4 thus sensing the electric potentials VA, VB on the output terminals of the SLIC. This comparing unit 4 further comprises a control input terminal D, connected to a terminal of a connected between this control input terminal and a terminal BAT having the supply voltage or potential VBAT. The reference voltage source REF has a reference voltage VR between its terminals. The potential VD at the control input terminal D is hence related to the voltage VBAT through the reference voltage VR. Thus, the voltage VD appearing at the input terminal D will be VBAT+V1. For example, if VBAT=−100 V which is a typical value and VR=4 V, VD=−96 V.

The comparing unit 4 generates an output control current 13, which is provided to the control input terminal C of the current reducing unit 3 as long as the voltages VA and VB sensed on the output terminals A and B are below, i.e. are more negative than, the voltage VD, this being valid for a negative supply voltage VBAT as is conventional. For a positive supply voltage an opposite condition is sensed, however, this case not being discussed anymore herein. The voltage VC at the terminal C will strive to be equal to the VGND potential, the resistor R1 discharges the capacitor C1 to ground VGND.

When a periodic input signal VIN that is to be transformed to the actually applied ring signal VL is provided to the general input terminal IN, the input signal is thus converted to two currents I1 and I2 having the same magnitude. The currents I1 and I2 are fed to the current reducing unit 3. If the voltage VC sensed at the input terminal C of the current reducing unit has the same potential as the potential as the ground potential VGND, the currents I1' and I2' output from the current reducing unit 3 will have the same magnitude as the input currents I1 and I2. I1' and I2' are fed to the current amplifiers 5 and 6 and amplified by factors +g and −g, respectively, forming the output current IL applied and flowing through the ring signal load RL.

The potentials on the A output line and the B output line, i.e. VA and VB, have an anti-phase relation to each other. The difference between these potentials VA and VB, i.e. VL, is a periodic voltage that is hence basically centered about the midpoint potential VBAT/2, due to an electrical circuit conventionally used in SLICs, not shown, that is assumed to be arranged on the SLIC considered herein. This is seen in the diagram of FIG. 2a. Further, when the input signal VIN at the general input terminal IN is equal to zero the output potentials VA and VB will each be equal to VBAT/2 and hence the output ring signal VL will be equal to zero.

If the input signal VIN at the input terminal IN is set so that the potential VA or VB on one of the general output lines A and B is below the potential at the control input terminal D of the comparing unit 4, the comparing unit 4 will output a current 13 to the control terminal C of the current reducing unit 3.

Thus, the potential at the control terminal C of the unit 3 increases and the unit 3 will reduce the currents I1' and I2' output from it. The reduced currents I1' and I2' will result in a reduced ring signal load current IL and hence a reduced voltage output ring signal voltage VL, as seen in the diagram of FIG. 2b at the time t1.

The potential VC will have a continuously increasing potential until the potential VA or VB is no longer lower than the voltage VD, see the time t2 in FIG. 2b. During the interval between the times t1 and t2, the output ring AC signal over the load RL will be distorted.

Furthermore, the time constant for the circuit formed by the resistor R1 and the capacitor C1 connected in parallel to the control terminal C of the current reducing unit 3 is preferably chosen to have a low value in relation to the frequency of the input AC signal at the general input terminal IN. Thus, the voltage VC will only be reduced very little up to the next halfcycle of the periodic ring signal. As a result, the output ring signal voltage VL will only increase very little when the potential VA or VB again become lower than the voltage VD. The potential VC will then only have to be adjusted slightly in order for the potentials VA and VB to be no longer below the potential VD. In the case where only a slight adjustment is made the distortion will become neglectable, as is seen in FIG. 2b after the time t3.

If the voltage VR of the reference voltage source REF is chosen correctly it is possible to ensure that the current amplifiers 5 and 6 are not saturated. Thus, the minimum voltage difference between the output terminals of the final stages and the supply voltages VGND and VBAT is determined, see the diagram of FIG. 2b after the time t3. Hence, the swing of the output ring signal voltage VL is equal to (abs (VBAT)−2*VR).

However, the reference voltage VR does not need to be fix.

Thus, in some applications it can be advantageous to be able to change the value of the reference voltage VR of the reference voltage source REF.

Furthermore, the device for controlling the ring signal voltage as described herein is shown integrated on the SLIC and only comprising one reference voltage connected to VBAT. However, the ring signal control device can be implemented as a separate device connectable to a SLIC. Also, the device can use one or several reference voltages other than the VBAT voltage. For example, a reference voltage connected to the ground voltage VGND can be used instead of or as a supplement to the reference voltage connected to VBAT.

In another preferred embodiment the device senses a parameter related to the potentials at the output lines A, B of the SLIC 1 instead of the actual output potentials. Thus, the device can be arranged to sense the voltage VL, i.e. the difference between the output voltages VA, VB on the output terminals of the SLIC, which is compared to a predetermined reference voltage.

The use of the method and device as described herein will achieve a control system, which ensures that the voltage over the ring signal load always is as high as possible without risking saturation of the final stages and a distortion of the output ring signal.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of applying a ring signal voltage from a subscriber line interface circuit to a ring signal load interconnected between first and second output terminals of the subscriber line interface circuit, comprising the steps of:
providing a periodic input ring signal voltage,
converting the periodic input ring signal voltage to two identical electrical currents,
amplifying the two identical electrical currents to provide amplified identical electrical currents, inverting only one of the two identical electrical currents or only one of the amplified identical electrical currents, providing the amplified and inverted identical electrical currents to the first and second output terminals thereby forming the ring signal voltage applied to the ring signal load, comparing at least a first voltage related to the potential at at least one of the first and second output terminals to at least one first reference voltage, and controlling the amplitude of the generated ring signal voltage in response to the comparison.

2. A method according to claim 1, wherein in the step of controlling, the amplitude of the two identical electrical currents is reduced in the same proportion.

3. A method according to claim 1, wherein in the step of controlling, the controlling is made only during a predetermined time period.

4. A method according to claim 3, wherein the predetermined period is small compared to a period of the periodic input ring signal voltage.

5. A method according to claim 1, wherein the amplitude of the output ring signal voltage is reduced if at least one of the potentials at the first or second output terminals or a voltage related thereto exceeds said at least one reference voltage.

6. A method according to claim 1, wherein the reference voltage is given a value ensuring that a minimum voltage applied between the output terminals and a supply voltage terminal/supply voltage terminals of the final stages of the SLIC can be determined.

7. A method according to claim 1, wherein the reference voltage is related to a supply voltage of the final stages of the SLIC.

8. A method according to claim 1, wherein two reference voltages are compared to the potential related to at least one of the output terminals.

9. A method according to claim 1, wherein two potentials, one related to the first output terminal of the SLIC and the other one related to the second output terminal of the SLIC, are compared to at least the first reference voltage.

10. A device for providing from a subscriber line interface circuit an output ring signal voltage to a ring signal load interconnected between first and second output terminals of the subscriber line interface circuit, comprising:

a ring signal source providing a periodic input ring signal voltage, a converter connected to the ring signal source for converting the periodic input ring signal voltage to two identical electrical currents, two current amplifiers connected to the converter for amplifying the two identical electrical currents to provide amplified identical electrical currents, an inverter connected to invert only one of the two identical electrical currents or only one of the amplified identical electrical currents, means connected to conduct the amplified and inverted identical electrical currents to the first and second output terminals thereby forming the ring signal voltage applied to the ring signal load, comparing means connected to compare at least a first voltage related to the potential at least one of the first and second output terminals to at least one first reference voltage, and control means connected to the comparing means for controlling the amplitude of the generated ring signal voltage in response to the comparison.

11. A device according to claim 10, wherein the control means comprise current reducing means for reducing the amplitude of the two identical electrical currents by the same fraction.

12. A device according to claim 10, wherein the control means are adapted to receive a control signal from the comparing means during only a predetermined time period.

13. A device according to claim 10, wherein the predetermined period is arranged to be small compared to a period of the periodic input ring signal voltage.

14. A device according to claim 10, wherein the control means include an input control terminal connected to a constant potential through an electrical circuit comprising a capacitor and a resistor, the capacitor connected to be discharged through the resistor, thereby always reducing gradually the potential at the input control terminal to approach the constant potential.

15. A device according to claim 10, further comprising means for reducing the amplitude of the ring signal if at least one of the voltages at the first or second output terminals or a voltage related thereto exceeds the reference voltage.

16. A device according to claim 10, wherein the reference voltage has a value, which ensures that a minimum voltage applied between the output terminals and a supply voltage terminal/supply voltage terminals of final stages of the SLIC can be determined.

17. A device according to claim 10, wherein the reference voltage source is related to a supply voltage of final stages of the SLIC.

18. A device according to claim 10, further comprising means for comparing two reference voltages to the voltage related to the potential of at least one of the output terminals.

19. A device according to claim 10, further comprising means for comparing two voltages, one related to the first output terminal of the SLIC and the other related to the second output terminal of the SLIC, to at least the first reference voltage.

* * * * *

UNITED STATES PATENT AND TRADEMARK OFFICE
CERTIFICATE OF CORRECTION

PATENT NO. : 6,973,181 B2
DATED : December 6, 2005
INVENTOR(S) : Anders Emericks and Henrik Hellberg It is certified that error appears in the above-identified patent and that said Letters Patent is hereby corrected as shown below:

<u>Title page,</u>
Item [30], Foreign Application Priority Data, delete "June 21, 2001 (SE)" and replace with -- June 21, 2000 (SE) --.

Signed and Sealed this

Twenty-eighth Day of February, 2006

JON W. DUDAS
*Director of the United States Patent and Trademark Office*